(No Model.) 2 Sheets—Sheet 1.
J. W. BROOK.
TROUGH FOR THE MANUFACTURE OF ICE.
No. 419,918. Patented Jan. 21, 1890.
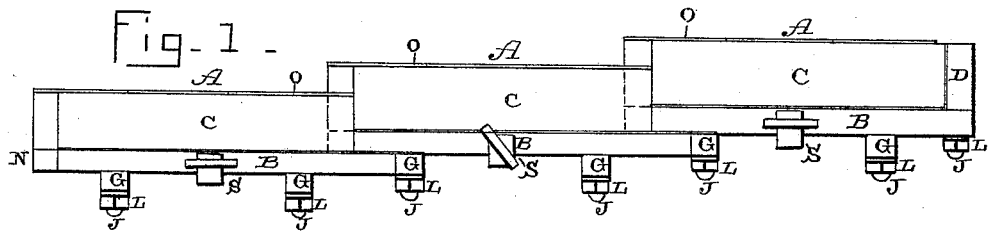
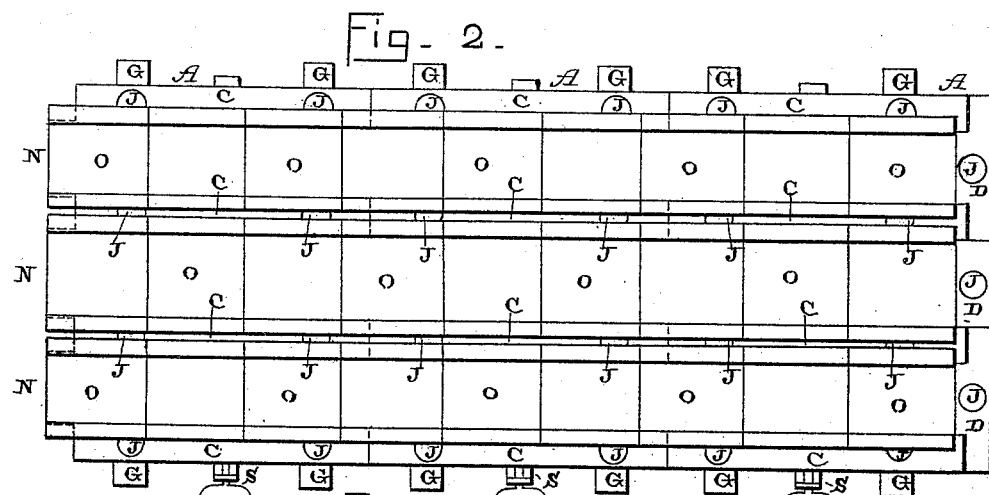
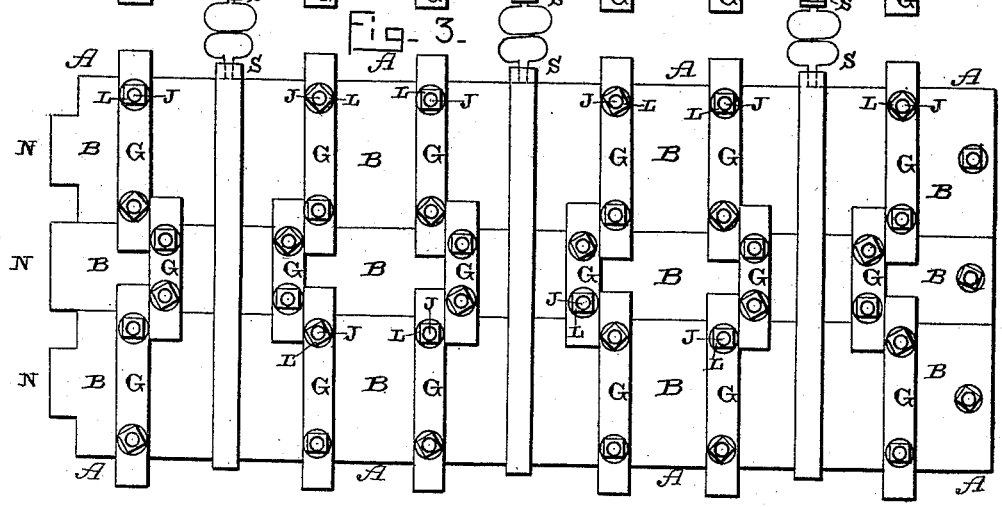
Witnesses:
E. P. Ellis,
L. L. Burket.
Inventor:
Jas. W. Brook,
per F. A. Lehmann,
atty.

(No Model.) 2 Sheets—Sheet 2.

J. W. BROOK.
TROUGH FOR THE MANUFACTURE OF ICE.

No. 419,918. Patented Jan. 21, 1890.

Witnesses:
E. P. Ellis,
L. L. Burket.

Inventor:
Jas. W. Brook,
per F. A. Lehmann,
atty

UNITED STATES PATENT OFFICE.

JAMES W. BROOK, OF LYNCHBURG, VIRGINIA.

TROUGH FOR THE MANUFACTURE OF ICE.

SPECIFICATION forming part of Letters Patent No. 419,918, dated January 21, 1890.

Application filed March 28, 1889. Serial No. 305,141. (No model.)

*To all whom it may concern:*

Be it known that I, JAMES W. BROOK, of Lynchburg, in the county of Campbell and State of Virginia, have invented certain new and useful Improvements in Troughs for the Manufacture of Ice; and I do hereby declare the following to be a full, clear, and exact description of the invention, such as will enable others skilled in the art to which it pertains to make and use it, reference being had to the accompanying drawings, which form part of this specification.

My invention relates to an improvement in troughs for making ice; and it consists in, first, the combination of two or more troughs provided with vertical sides, with an intermediate trough which is placed between them, and which intermediate trough has no sides except those which are formed by the troughs upon opposite sides; second, the combination of two or more troughs provided with cross-pieces upon their under sides, and which cross-pieces have their ends to project beyond the sides of the trough, so as to catch under the next adjoining trough, and thus assist in bracing and strengthening the troughs together.

The object of my invention is to produce a cheap and simple apparatus by means of which ice can be produced in cakes of any desired length and size during freezing weather by simply allowing water to run slowly through the troughs, so that it will be frozen into solid ice, and thus enable persons to take advantage of every freezing spell of weather to make ice for future use at little or no expense.

Figure 4:
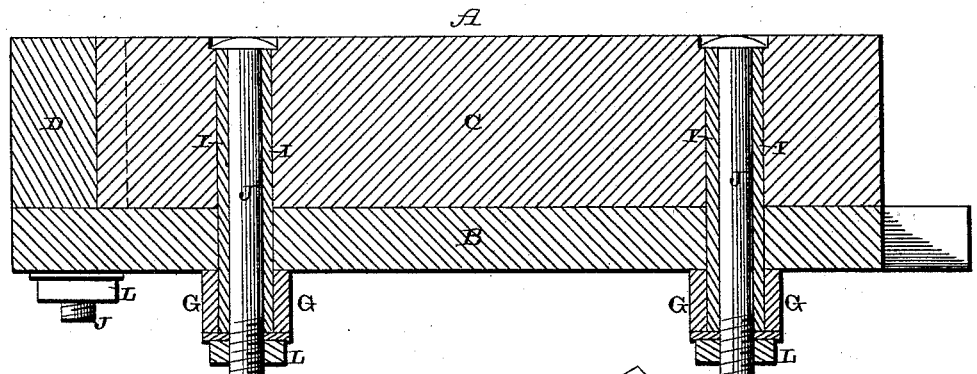
Figure 5:
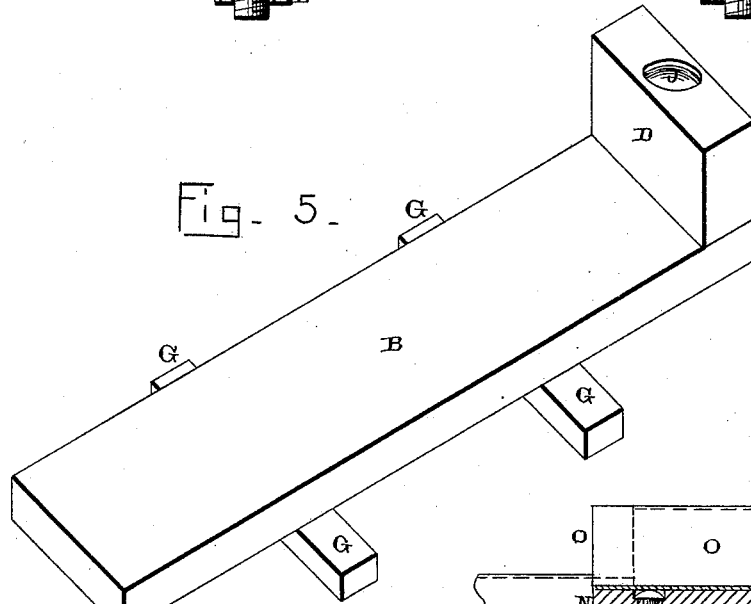
Figure 6:
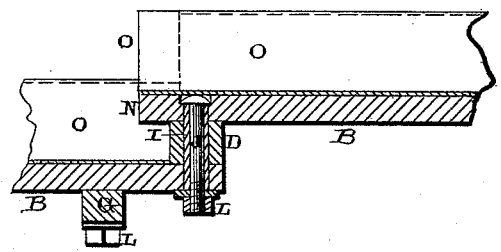

Figure 1 is a side elevation of an apparatus which embodies my invention. Fig. 2 is a plan view of the same. Fig. 3 is an inverted view of the same. Fig. 4 is a vertical section taken lengthwise through the sides of one of the troughs, showing the tubes. Fig. 5 is a perspective of one of the troughs without sides. Fig. 6 shows the manner of connecting the ends of the trough together.

A represents a trough of any suitable length, width, and height desired, and which is composed of the bottom pieces B, the side pieces C, and the adjustable end pieces D. A number of troughs have their ends detachably connected together, so as to form a continuous trough of any desired length; but each succeeding trough is placed at any desired distance below the one above it, so as to accommodate the trough to the inclination of the ground upon which they are placed. Each trough is to be placed in a horizontal position, so that the water which is introduced into its outer end will flow but slowly through it. If the inclination of the ground or side of the hill upon which the troughs are placed is considerable, then instead of having the ends of each trough rest directly in the end of the next adjoining one each lower trough will be provided with a removable end piece D, which will be proportioned in height to the inclination of the ground. If the inclination is not very great, the end pieces will have but little height to them; but if the inclination is greater then the end pieces will have heights corresponding to the inclination. By having end pieces which vary in height the troughs can be adjusted to any inclination of ground or height that may be desired.

In securing the sides and end pieces to the bottoms and the cross-pieces or cleats G, which extend across the bottoms, holes are first bored vertically through the end pieces and sides, the bottoms, and cleats or cross-pieces, and then the tubes I, which fit snugly in the holes, are inserted, and these tubes extend from the top edge of the side or end pieces down through the bottom, or through the bottom and cross-piece, and then the clamping-bolt J is passed through the tube and secured by means of a nut L, in the usual manner. These tubes serve to brace and strengthen the parts together or to prevent any warping when exposed to the weather or changes of the atmosphere. In order to make a tight joint between the sides, end pieces, and bottom, pieces of cloth, rubber, or any suitable material may be placed between their edges, and thus each trough made water-tight at these points. The ends of the bottoms are made to project beyond the end of each trough, as shown at N, so as to fit inside of the upper end of the next adjoining trough, as shown in Fig. 6, and thus assist in securing and bracing the troughs together. The ends of the cross-pieces or cleats project beyond the sides of each trough, so that these projecting ends will catch under the edges of the next adjoining trough, and thus assist in bracing and securing them together. Where a number of troughs are placed side by side, as shown in Figs. 2 and 3, every first and third trough is provided with sides, while the second trough, placed between them, consists of only a bottom piece, which is provided with cross-pieces or cleats on its bottom, and a removable end piece. The sides of the two perfect troughs then form the sides for this middle trough, which has no sides, thereby forming only a single partition between the cakes or blocks of ice, and saving lumber which would be necessary to form two sides. Where only one partition is placed between the two blocks of ice, less protection from the atmosphere is afforded to the water which is to be frozen than would be the case if two thicknesses of lumber were used. Having only a single partition between the cakes also enables the cakes to be more readily gotten at and handled than if the additional sides were used. After the troughs are placed together, as shown in Figs. 2 and 3, they are held together by the clamps S, and after the troughs have become filled with ice the clamp is removed and the troughs are separated, so as to allow the cakes and troughs to be freely handled in any manner that may be desired. After the troughs have been separated the ice from the middle trough, having no sides, is more easily handled than the ice from the troughs which have them.

In order to enable the troughs to be made of coarse lumber and to enable the whole mass of ice formed in each trough to be divided into blocks or cakes, I place inside of each trough a series of pieces of tin $o$, of any desired length, and which overlap each other at their ends and form linings for each trough. These linings serve to prevent the ice from coming in contact with the painted boards, and serve to overlap the joints where the troughs are connected together. After the trough has been filled with ice it is only necessary to cut through the ice at each joint of the tin, and then when the block is removed the ends of the tin spring apart, so as to instantly release the block.

When the water is first turned into the upper end of each of the upper troughs, it flows through the trough toward its lower end with a speed proportioned both to the volume of water which is admitted and to the temperature of the atmosphere. If the weather is very cold, the water flows but a short distance before its temperature is reduced to or below the freezing-point, and then it begins to freeze. In this manner trough after trough is filled with ice, which is more or less slowly formed, according to the temperature of the atmosphere. Large quantities of ice can thus be formed whenever the temperature falls below freezing-point, and thus enable people to form the ice from pure water secured from springs or wells. As long as the temperature remains below freezing-point the formation of ice can be carried on.

The troughs are here shown in a line with each other; but it is evident that they can be placed at angles to each other, if so desired, for the purpose of economizing space.

I do not confine myself to any particular method in arranging the troughs in relation to each other, for this may be varied at will.

Having thus described my invention, I claim—

1. The combination of three troughs placed side by side, the outside ones being formed by a bottom piece and side pieces, and the intermediate trough formed by a bottom piece and the sides of the two outer troughs, substantially as described.

2. The combination of a number of troughs placed together end to end, and which have their ends to overlap where they are joined together, with removable end pieces, which are placed in the lower troughs below the lower ends of the upper troughs, by which the height between the troughs may be regulated, substantially as shown and described.

3. In a device for producing ice, the combination of a series of troughs side by side, provided with cross-pieces at their bottoms having projecting ends for supporting each other, and removable side pieces and transverse clamps, which pass below the troughs and are provided with upturned ends, which bear against the side pieces, whereby the clamps are held in place and the troughs secured together, substantially as specified.

In testimony whereof I affix my signature in presence of two witnesses.

JAMES W. BROOK.

Witnesses:
  F. A. LEHMANN,
  THOMAS W. SORAN.